United States Patent [19]

Skoli et al.

[11] 4,350,503
[45] Sep. 21, 1982

[54] FLUID FLOW METERING DEVICE

[75] Inventors: Sigmund P. Skoli, Elmwood Park; David M. Kemp, Naperville; Harry G. Mojonnier, River Forest, all of Ill.

[73] Assignee: FMC Corporation, Chicago, Ill.

[21] Appl. No.: 295,643

[22] Filed: Aug. 24, 1981

Related U.S. Application Data

[63] Continuation of Ser. No. 151,393, May 13, 1980, abandoned.

[51] Int. Cl.³ .......................... B01D 19/00; A23L 2/00
[52] U.S. Cl. .......................................... 55/165; 55/196; 99/277.2; 251/61.4; 261/DIG. 7; 426/477; 426/487
[58] Field of Search .......................... 55/165, 189, 196; 251/61.4, 63.6, 212; 99/277.2, 323.1; 261/DIG. 7, DIG. 27; 426/475, 477, 487

[56] References Cited

U.S. PATENT DOCUMENTS

| | | | |
|---|---|---|---|
| 1,790,911 | 2/1931 | Gibson | 55/165 |
| 1,818,188 | 8/1931 | Bergquist | 55/165 |
| 2,097,158 | 10/1937 | Joos | 55/165 X |
| 2,685,937 | 8/1954 | Clark et al. | 55/165 X |
| 2,964,304 | 12/1960 | Rice | 251/212 X |
| 3,170,483 | 2/1965 | Milroy | 251/212 X |
| 3,237,808 | 3/1966 | Witt et al. | 222/64 |
| 3,446,241 | 5/1969 | Skoli | 251/61.4 X |
| 3,945,302 | 3/1976 | Downs | 251/61.4 X |
| 4,090,534 | 5/1978 | Martin et al. | 251/212 X |
| 4,112,828 | 9/1978 | Mojonnier et al. | 55/189 X |
| 4,191,784 | 3/1980 | Mojonnier et al. | 55/53 X |
| 4,216,711 | 8/1980 | Skoli et al. | 426/477 X |
| 4,265,167 | 5/1981 | Mojonnier et al. | 426/477 X |
| 4,300,923 | 11/1981 | Skoli et al. | 261/DIG. 7 |

Primary Examiner—Robert H. Spitzer
Attorney, Agent, or Firm—Trexler, Bushnell & Wolters, Ltd.

[57] ABSTRACT

There is disclosed a fluid flow metering device for use, for example, in a system for preparing a carbonated beverage wherein deaerated water and a beverage concentrate are mixed together in closely controlled proportions. The system can also include a vessel for storing a quantity of water and a deaerator for removing air from the water. The fluid flow metering device controls the rate of water flow from the vessel to the deaerator and is responsive to the water flow rate demand of the deaerator. The metering device includes a valve block having a fluid conducting channel for conducting water from the vessel to the deaerator, and a bore intersecting the channel. A valve element is disposed within the bore and is movable into and out of the channel for modulating the water flow rate through the channel. Flow rate demand sensing means within the deaerator provides a control signal responsive to the water flow rate demand of the deaerator control means are coupled to the valve element and to the sensing means for moving the valve element in response to the control signal so as to modulate the water flow rate through the channel in direct relation to the flow rate demand of the deaerator.

5 Claims, 3 Drawing Figures

FLUID FLOW METERING DEVICE

This application is a continuation of application Ser. No. 151,393, filed May 13, 1980, now abandoned.

BACKGROUND OF THE INVENTION

The present invention relates generally to systems for preparing carbonated beverages and more particularly to a fluid flow metering device for controlling the rate of fluid flow in response to demand changes occurring downstream of the metering device.

Modern methods of preparing beer or other carbonated beverages require the use of deaerated or deoxygenated water. The deaerated water is mixed, in accurately controlled proportions, with a beverage concentrate. The mix is then cooled and carbonated prior to final packaging.

Deoxygenation improves beverage stability during its preparation and during the filling process, and during storage prior to consumption. If the beverage is contained within a can, inclusion of air can permit deterioration of the plastic can lining, thereby damaging the can and spoiling the flavor of the beverage.

In many modern beverage preparation systems, deaeration apparatus is provided. These devices commonly reduce air contained within the water to amounts on the order of a few parts per million. Although this level of deoxygenation is effective for soft drink beverages and the like, air-to-water ratios must be reduced to an order of a few parts per billion for the preparation or brewing of beer. One such deaerating apparatus which is capable of deoxygenating water to these very low levels is disclosed and claimed in U.S. Patent Application Ser. No. 050,158, filed June 20, 1979, U.S. Pat. No. 4,265,167, which is a Continuation of U.S. Patent Application Ser. No. 871,539, filed Jan. 23, 1978, now abandoned, and which is assigned to the assignee of the present invention.

Such systems prepare beverages at a very high rate of speed. The rate of water flow to the deaeration apparatus or deaerator must be carefully controlled between very close limits so that the deaerator is never in need of water on the one hand and never overfilled with water on the other. Since many gallons of beverage are processed each hour, should a system component downstream reduce its demand for water even slightly for only a short time, the deaerator could be quickly overfilled or supplied with an excess of water. Conversely, should downstream demand increase even slightly, the deaerator, in a relatively short period of time, would be starved for water. Of course, neither situation is desirable.

It is therefore a general object of the present invention to provide a system for preparing carbonated beverages or the like wherein the water flow rate to the system deaerator is accurately controlled.

It is a further object of the present invention to provide such a system wherein the water flow rate to the deaerator is controlled responsive to the water flow rate demand placed on the deaerator by downstream equipment.

It is another object of the present invention to provide a fluid flow metering device which controls the rate of fluid flow in response to downstream fluid flow rate demands.

It is still another object of the present invention to provide such a fluid flow metering device for use in a system which prepares carbonated beverages wherein the metering device controls the rate of water flow to the system deaerator in direct relation to the flow rate demand of the deaerator.

SUMMARY OF THE INVENTION

The invention therefore provides a fluid flow metering device for controlling the flow rate of a fluid responsive to downstream fluid flow rate demands. The device comprises a valve block having a through channel and a bore communicating with the channel. The valve block is adapted to be coupled to fluid conducting inlet and outlet conduits with the channel in fluid communication therebetween. The device further includes a valve element within the bore, the valve element being movable and having an end portion projectable into the channel for varying the effective fluid conducting dimension of the channel. Control means are coupled to the valve element for moving the valve element within the bore in response to demand changes occurring downstream from the device. Thus, the effective fluid conducting dimension of the channel is varied in direct relation to the demand.

The invention further provides a fluid flow metering device for use in a system which prepares carbonated beverage from water and a concentrated beverage mix. The system including a vessel for storing a quantity of water and a deaerator for removing air from the water. The metering device comprises a valve block having a fluid conducting channel disposed between and in fluid communication with the vessel and the deaerator for conducting water from the vessel to the deaerator, and a bore intersecting the channel. A valve element within the bore moves into and out of the channel for modulating the water flow rate through the channel. A flow rate demand rate sensing means within the deaerator provides a control signal responsive to the water flow rate demand of the deaerator. Control means coupled to the valve element and to the sensing means moves the valve element in response to the control signal. Thus, the water flow rate through the channel is modulated in direct relation to the flow rate demand of the deaerator.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by making reference to the following description taken in conjunction with the accompanying drawing in the several figures of which like reference numerals identify identical elements, and wherein:

DESCRIPTION OF THE PREFERRED EMBODIMENT

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Figure 1:
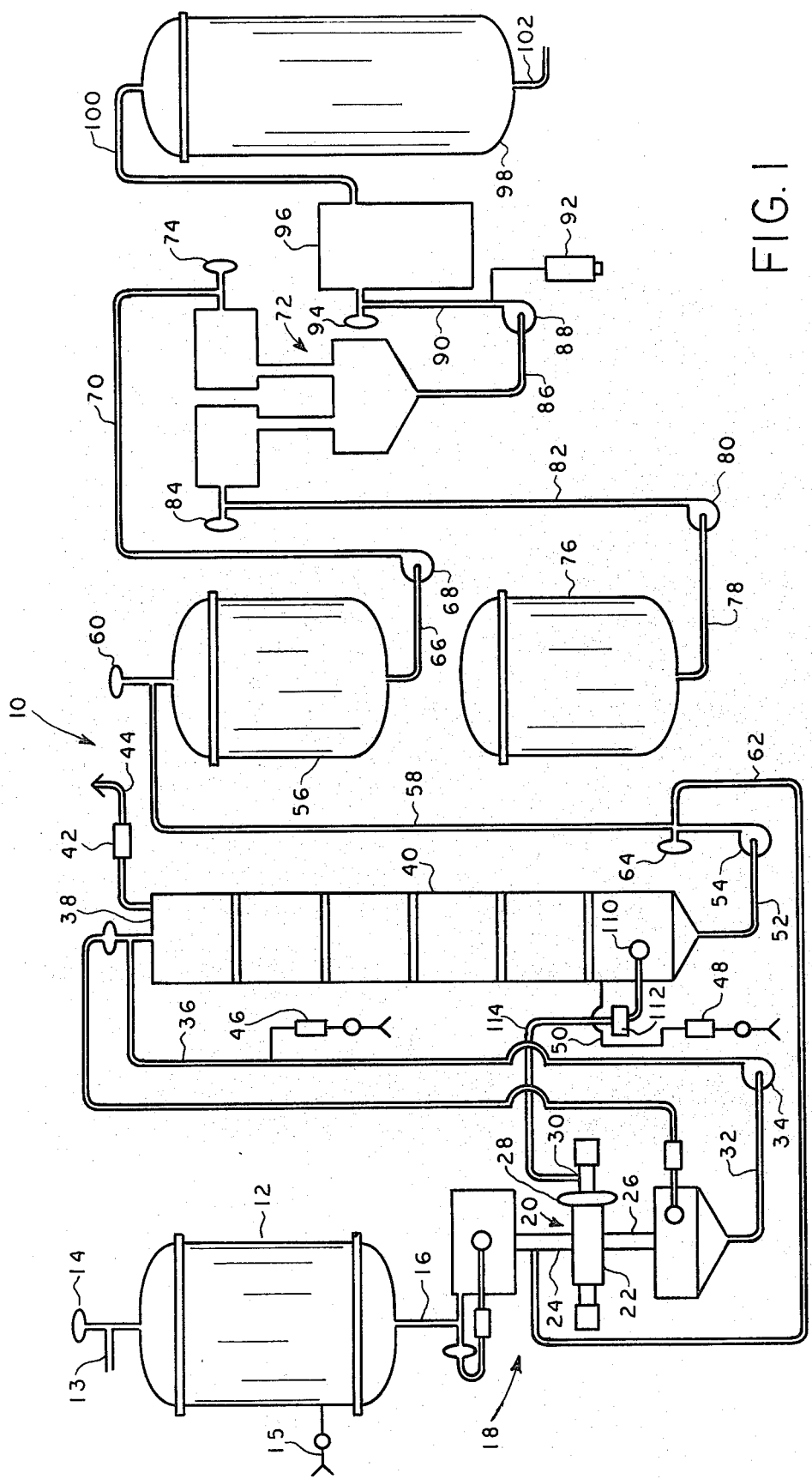
FIG. 1 is a schematic diagram of a beverage processing system including the present invention.

Turning first to FIG. 1, there is shown a system 10 for deaerating or deoxygenating water, and for mixing the deaerated water with beverage concentrate, and for thereafter cooling and carbonating the liquid mix. Here, a vessel 12 receives water from a remote source (not shown) through an inlet line 13 controlled by a valve 14. Preliminary cooling and deaeration occurs within this vessel 12, and a quantity of carbon dioxide gas is introduced through an inlet line 15. A conduit 16 routes the cooled, preliminarily deaerated water to a flow metering apparatus 18 which provides a carefully controlled flow of fluid through the remaining portions of the system.

The apparatus 18 includes a fluid flow metering device 20 embodying the present invention. The metering device 20, described in detail below, basically includes a valve block 22 having an axial through channel coupled in fluid communication between inlet and outlet conduits 24 and 26 respectively. The device 20 further includes an internal valve element which is projectable into the channel of the valve block 22. The valve element is movable by a control means 28 in response to an air pressure control signal at an input port 30 which is generated in response to the fluid flow demand downstream of the device 20. As a result, the movable valve element modulates or varies the effective fluid flow conducting dimension of the channel to thereby carefully control the rate of fluid flow through the apparatus 18. Of course, in this case, the fluid conducted by the metering device 20 is water.

The water is routed from the flow metering apparatus 18 through an exhaust line 32, a pressurizing pump 34, and a deoxygenating column inlet line 36, to the top 38 of a deaerator column 40. As the water within the column 40 is deoxygenated, the air driven off from the water is exhausted from the column through a one-way check valve 42 and an exhaust line 44.

To assist in the deoxygenation process within the column 40, and to displace the air driven from the water, carbon dioxide gas is introduced into the column 40. Here, the carbon dioxide gas is introduced into the column 40 by a carbon dioxide injector 46 which is in fluid communication with the inlet line 36, and by another carbon dioxide injector 48 which is in fluid communication with the bottom of the column 40 through a line 50. As a result, carbon dioxide gas is introduced into the column 40 through both the top 38 and the bottom of the column to provide a steady stream of carbon dioxide gas both upwardly and downwardly through the column.

At the bottom of the column 40, water is drawn through a column exhaust line 52 and a pump 54 to a cooling vessel 56 through a line 58 and a valve 60. Water exhausted from the column can be recirculated therethrough by the fluid connection of a return conduit 62 which is controlled by a valve 64. The return conduit 62 is coupled to the inlet line 24 of the metering device 20.

The deaerated and cooled water within vessel 56 is then carried from the vessel 56 through an exhaust line 66, a pressurizing pump 68, and a line 70 to a proportioner device 72 through a valve 74. Also, beverage concentrate, for example strong brew or high gravity beer, is introduced to the proportioner 72 from a remote vessel source 76 through an exhaust line 78, a pressurizing pump 80, and an inlet line 82. The flow of beverage concentrate is controlled by a valve 84 which introduces the beverage concentrate into the proportioner 72.

Within the proportioner 72, the deaerated water and beverage concentrate are mixed in accurately controlled proportions. The now-mixed beverage is drawn by a proportioner exhaust line 86 and a pressurizing pump 88 to a transfer line 90. Additional carbon dioxide can be introduced into this line 90 through a carbon dioxide injector 92. The preliminary carbonated beverage is then introduced, through a valve 94, to a polish filter 96 and then to a final storage tank 98 through a line 100. The cooled, carbonated beverage is then routed through an exhaust line 102 for delivery to storage (not shown) and subsequent handling.

Beverage processing systems of the type shown in FIG. 1 prepare carbonated beverages at a very high rate, on the order of hundreds of gallons per hour. Hence, it can be appreciated that a very high rate of water flow throughout the system is necessary to support such processing rates. It is important that the deaerator column 40 be supplied with sufficient water so that it is not starved for water, but it must not be supplied with water at an excessively high rate. The metering device 20 embodying the present invention is therefore provided to accurately control the water flow rate from the vessel 12 to the deaerator column 40 in response to the water flow rate demand of the column 40. To that end, a flow rate demand sensing means in the form of a float 110 is disposed within the bottom of a column 40. The float is coupled to an air valve 112 which provides air under pressure to a line 114. The air pressure within the line 114 is related to the flow rate demand of the column 40 as sensed by the float 110. The line 114 is coupled to the input port 30 of the control means 28 of the metering device 20.

When the flow rate demand of the column 40 decreases, the float 110 will rise within the column to cause the valve 120 to provide an increased air pressure to line 114. The increased air pressure to line 114 is sensed at the input port 30 to cause the control means 28 to move the valve element within the control device 20 further into the internal channel of the valve block 22 to thereby reduce the effective flow rate dimension of the internal channel. Conversely, when the flow rate demand of the column 40 increases, the float 110 will descend within the column to cause the air valve 112 to provide a decreased air pressure within the line 114. The decreased air pressure within the line 114 is sensed at the input port and causes the control means 28 to retract the valve element, thereby increasing the effective fluid flow dimension of the valve block channel and consequently increasing the flow rate through the metering device 20.

Figure 2:
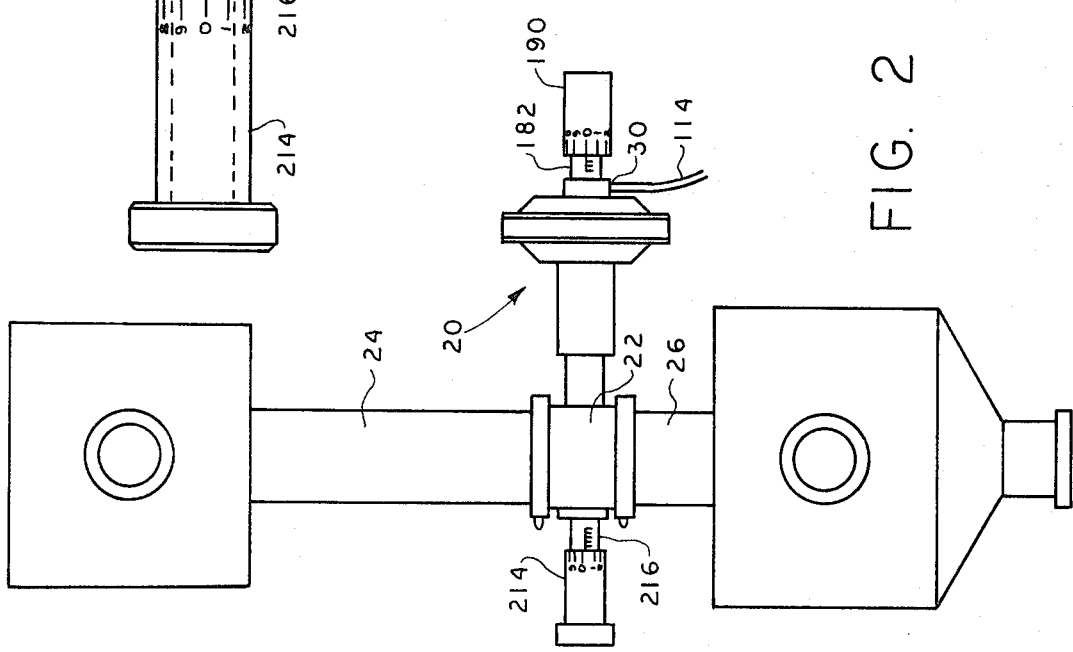
FIG. 2 is a side elevational view of a fluid flow metering device embodying the present invention installed between inlet and outlet conduits.

Referring now to FIG. 2, the metering device 20 embodying the present invention is disposed in operative relation between the inlet conduit 24 and the outlet conduit 26. As may best be seen in FIG. 3, the valve block 22 includes an axial through channel 120 which is elongated in transverse cross-section. When the metering device 20 is disposed in operative relation as seen in FIG. 2, the through channel 120 is in fluid communication between the inlet conduit 24 and the outlet conduit 26.

The valve block 22 has a sleeve-like extension 122 which terminates in a threaded flange 124. A bore 126 extends through the flange 124 and intersects or communicates with the channel 120. The bore 126 is preferably substantially normal to the axial channel 120.

Within the bore 126 there is disposed the aforementioned valve element 128 which takes the form of a piston. The piston 128 is substantially cylindrical and has a diameter dimension which is substantially equal to the spacing or distance between a pair of substantially parallel sidewalls 130 and 132 which partially define the channel 120. The piston 128 includes a circumferential groove 134 which accommodates an O-ring 136. The O-ring 136 provides a fluid tight seal between the piston 128 and the inner surface of the bore 126.

The piston 128 is movable within the bore 126 so that it may project into the channel 120 to reduce the effective fluid flow rate dimension of the channel 120. As previously mentioned, the movement of the piston 128 is caused by the control means 28 with the piston 128 being movable in response to the downstream water flow rate demand of the dearator column 40 (FIG. 1).

The control means 28 includes a diaphragm member 140 which is formed of a resilient material such as rubber. The diaphragm 140 is housed in a housing having a first housing portion 142 and a second housing portion 144. The housing portions and the diaphragm define first and second diaphragm chambers 146 and 148 respectively. The housing portion 144 includes a sleeve-like extension 150 which has a threaded bore 152 for receiving the flange 124 of the valve block 22.

The housing portion 144 also includes a second threaded aperture 154 which receives a bushing or cap 156. The cap 156 has an opening 158 at one end thereof to permit an operative connection between the piston 128 and the diaphragm 140, a shaft assembly including an inner shaft 160 and an outer sleeve 162. The inner shaft 160 includes a through aperture at one end thereof which is dimensioned to be received within a circular recess 164 of the piston 128. The piston 128 also includes a pair of aligned apertures and which may be aligned with the aperture of the shaft 160 for accommodating a coupling pin 170.

The inner shaft 160 includes a threaded reduced diameter end portion 172. The shaft portion 172 is arranged to be received by a rod member 174 which terminates in a head 175.

The shaft portion 172 is dimensioned for being received by the diaphragm 140. A reinforcement plate 176 is disposed on one side of the diaphragm, and a rear pressure plate 178 is disposed on the other side of the diaphragm. The reinforcement plate 176 permits a coiled spring 180 to be disposed over the sleeve 162 between the plate 176 and an annular surface 182 of the cap 156.

The rod member 174 is greater in diameter dimension than the aperture of the pressure plate 178 which receives the shaft portion 172 to thereby join the diaphragm, the reinforcement plate 176, and the pressure plate 178, in secured relation. As a result, the diaphragm 140 is operatively connected to the piston 128.

The housing portion 142 includes a rearward extension 182 having the input port 30 of the control means 28. To the input port 30 is coupled the pressurized air line 114 which is coupled to the air valve 112 (FIG. 1).

The rear extension 182 includes a bore 184 adapted to receive a guide extension 186 which extends from the pressure plate 178. The guide extension 186 and the bore 184 coact to guide the movement of the piston 128 and its connecting mechanism to the diaphragm 140 for rectilinear motion.

The rear end of the extension 182 has an outer thread 188 arranged to receive a correspondingly threaded vernier adjustment knob 190. The knob 190 has a cylindrical recess 192 defining an annular abutment surface 194 which circumscribes an aperture 196 permitting the rod 174 to pass therethrough. The head 175 of the rod 174 has an annular stop surface 168 and a notch 198 arranged to accommodate a screw driver or the like to enable the threading of the rod 174 onto the shaft portion 172.

For transmitting the pressurized air within the conduit 114 to the diaphragm 140, the housing extension 182 includes an inner channel 200 which communicates with the port 30 and the rear surface of the pressure plate 178. As a result, when the pressure in line 114 reaches the pressure exerted on the reinforcement plate 176 by the coiled spring 180, the diaphragm 140 will deflect in a forward direction towards the annular channel 120. Because the piston 128 is operatively coupled to the diaphragm 140, it also will move towards and into the channel 120.

In operation, when the deaerator column 40 experiences a decrease in water flow rate demand, the air pressure within conduit 114 will increase. The increase in air pressure within the conduit 114 is transmitted through the input port 30, the channel 200 and against the back plate 178. When the pressure is great enough to oppose the force exerted by the spring 180 on the diaphragm, the back plate 178 and the diaphragm 140 will move in a forward direction towards the channel 120. As a result, the piston 128 will have its end portion 139 project into the channel 120 to reduce its effective fluid flow rate dimension to thereby decrease the fluid flow rate of water from the vessel 12 to the deaerator column 40.

When the deaerator column 40 experiences an increased demand in water flow rate, the air pressure within line 114 will decrease so that the pressure exerted on the diaphragm will be less than the pressure exerted on the diaphragm by the coiled spring 180. As a result, the diaphragm 140 will be deflected in a rearward direction away from the channel to cause the piston 128 to also be moved away from the channel. As a result, the piston end portion 139 will extend into the channel by a lesser amount to thereby increase the fluid flow rate capacity of the channel and allow increased water flow rate to the deaerator column.

Of course, during operation of the beverage processing system, the air pressure within the conduit 114 will be established so that the piston 128 is always within the channel 120. Thereafter, the flow rate through the channel may be modulated by the diaphragm 140.

In accordance with another feature of the present invention, the knob 190 forms a vernier adjustment means whereby the minimum effective dimension of the channel may be accurately established. As may be appreciated in FIG. 3, the distance in which the piston 128 may project into the channel is limited by the spacing between the annular stop surface 168 of the head 176 and the annular abutment surface 194 of the knob 190. That distance may be readily adjusted by rotating the knob 190 relative to the housing extension 182. The knob 190 and the housing extension 182 may be provided with vernier adjustment indicating notches or the like to allow ready adjustment of the minimum possible dimension of the channel 120. In actual practice, it is preferred to set the knob 190 so that the minimum possible dimension of the channel 120 conducts water at a rate of about five percent below that normally required by the system.

Figure 3:
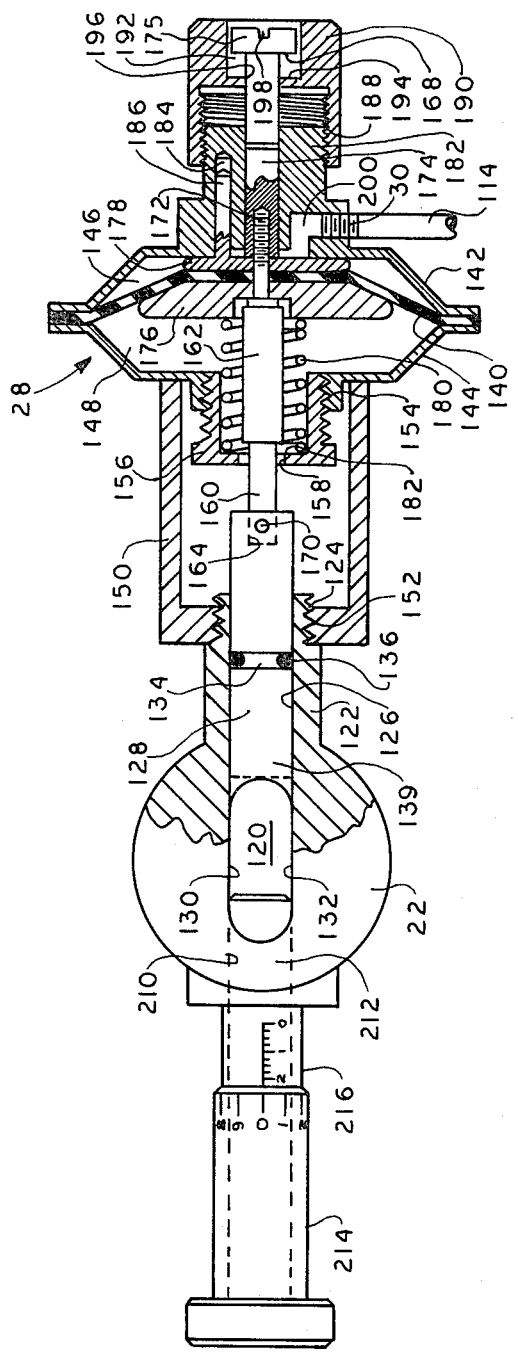
FIG. 3 is a side view, partly in cross section, of the fluid flow metering device of FIG. 2.

As may also be noted in FIG. 3, and in accordance with another feature of the present invention, the valve block 22 includes another bore 210 which intersects the channel 128 and which is directly opposite the first bore 126 of the valve block 22. The bore 210 accommodates a second valve element or piston 212 which is also projectable into the channel 120 to a stationary position to establish a maximum effective fluid flow dimension of the channel 120. The piston 212 is preferably coupled to a second vernier adjustment means such as a knob 214 through a tubular extension 216 of the valve block 22. The tubular extension 216 and the knob 214 may also be provided with vernier adjustment indicia on the outer surfaces thereof to afford ready adjustment of the maximum fluid flow rate dimension of the channel 120. In actual practice, it is preferred that the knob 214 be set to provide a maximum dimension of channel 120 for conducting water at a rate of about five percent above that normally required by the system.

From the above, it may be appreciated that the fluid flow metering device in actual practice is set to vary the water flow rate therethrough in a range of ten percent of the normal flow rate demand of the system, from five percent above, to five percent below the normal rate. This exhibits a distinct advantage over prior beverage processing systems where the water flow rates to the deaerator have been varied from no flow to the normal flow rate. With such prior systems, it was not uncommon for the deaerator to be starved of water after initial overreaction to water flow and thereafter be overflowing after overreaction to the starved condition. This situation is avoided with the present invention because the water flow rate is varied over a much smaller range.

While a particular embodiment of the present invention has been shown and described in detail, it will be obvious to those skilled in the art that changes and modifications of the present invention, and its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A system for processing a carbonated beverage or the like from water and a beverage concentrate, the system including a vessel for storing a quantity of water, a deaerator for removing air from the water and having a top within which the water is deoxygenated and a bottom within which the deoxygenated water is collected, a fluid flow metering device for controlling the rate of flow of water from the storage vessel to the deaerator and responsive to the water flow rate demand of the deaerator, the fluid flow metering device comprising an inlet conduit, an outlet conduit, a valve block interposed between the inlet and outlet conduits, the valve block defining a through channel providing fluid communication from the inlet conduit to the outlet conduit, a valve element-accepting bore communicating with the through channel and extending substantially normally thereto in two mutually opposed directions, and an infinitely adjustable valve selectively projectable into the valve block channel, the valve including a first fluid flow valve element within said bore and projectable into said channel, vernier adjustment means coupled to the first element for infinitely adjusting the distance in which the first element projects into the channel for establishing a maximum effective fluid flow dimension of the channel, and a second valve element within said bore and disposed oppositely to said first valve element for additionally varying the effective fluid conducting dimensions of the channel to amounts less than the maximum effective fluid flow; the system further including control means for moving the second valve element responsive to the amount of water in the deaerator bottom, the control means including an air-filled line extending from the deaerator bottom to the fluid flow metering device, a float carried in the deaerator bottom for sensing the height of water in the deaerator bottom, an air valve connected to the float and the air filled line for infinitely and continuously varying pressure in the air line in response to variations in the position of the float, an air-tight chamber at the valve in pressure-sensitive communication with the air-filled line, a portion of the chamber being defined by a diaphragm connected to the second valve element, a spring biasing element acting to urge the diaphragm and connected second valve elements into retracted positions wherein the maximum effective flow rate determined by the first element is permitted, variations in air pressure within the air line and connecting chamber acting to move the diaphragm and second valve element away from their retracted positions against the influence of the spring biasing element so as to infinitely and continuously vary the positions of the second valve element and correspondingly infinitely and continuously reductively vary the effective fluid flow rate through the metering device from the set maximum flow rate.

2. A device as defined in claim 1 wherein said through channel is elongated in transverse cross-section and includes a pair of substantially parallel sidewalls and wherein said end portion of said valve element has an effective maximum width dimension substantially equal to the distance between said sidewalls for sliding movement thereon.

3. A device as defined in claim 1 wherein said control means further includes stop means for limiting the distance in which said second valve element is projectable into said channel to thereby establish a minimum effective dimension of said channel.

4. A device as defined in claim 3 wherein said stop means is adjustable.

5. A device as defined in claim 3 wherein said stop means comprises vernier adjustment means for adjustably setting the minimum effective dimension of said channel.

* * * * *